No. 671,369. Patented Apr. 2, 1901.
P. BROWN.
DRAFT MECHANISM.
(Application filed Jan. 26, 1900.)
(No Model.) 3 Sheets—Sheet 1.
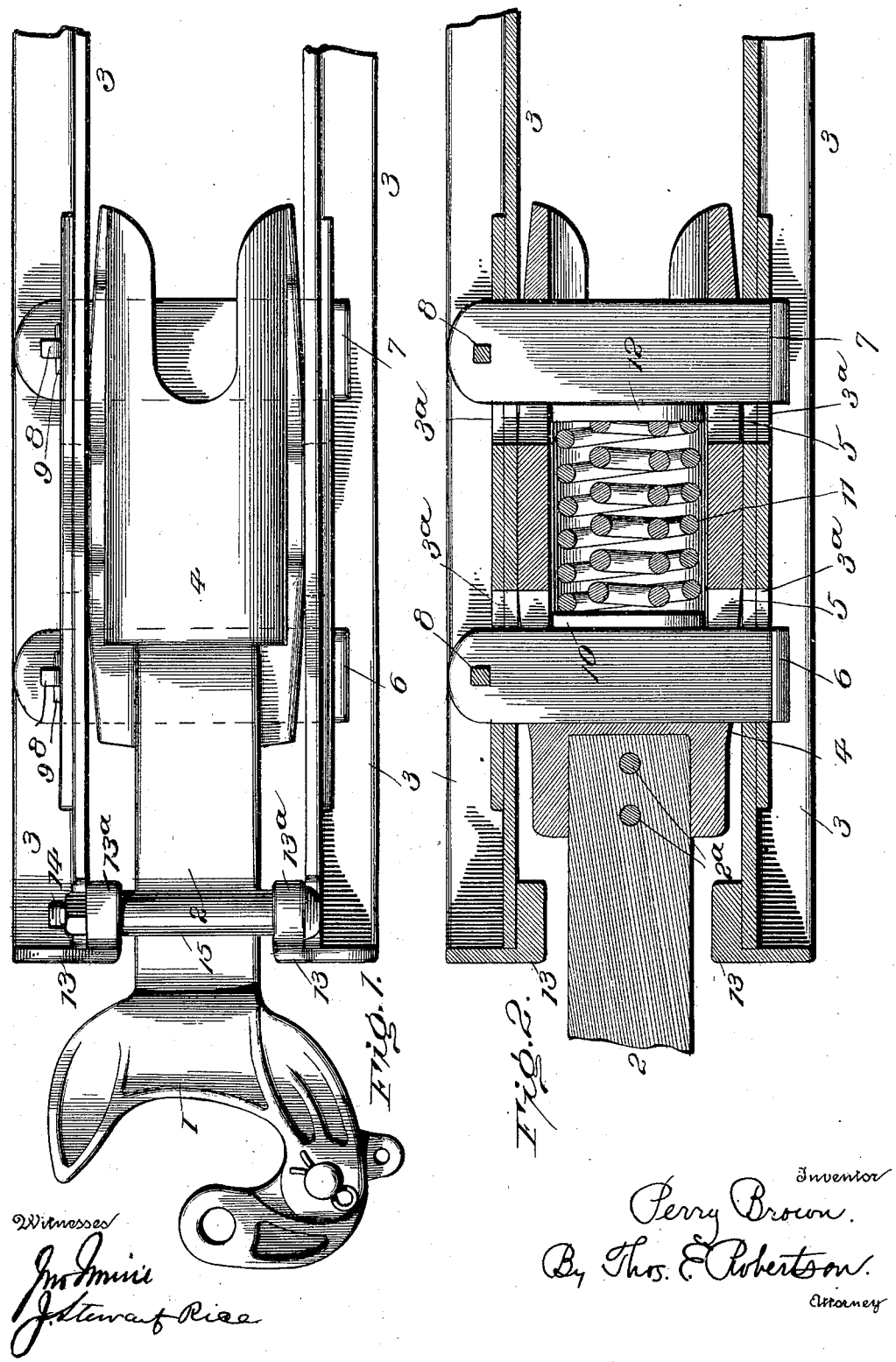
Witnesses
Inventor
Perry Brown.
By Thos. E. Robertson.
Attorney

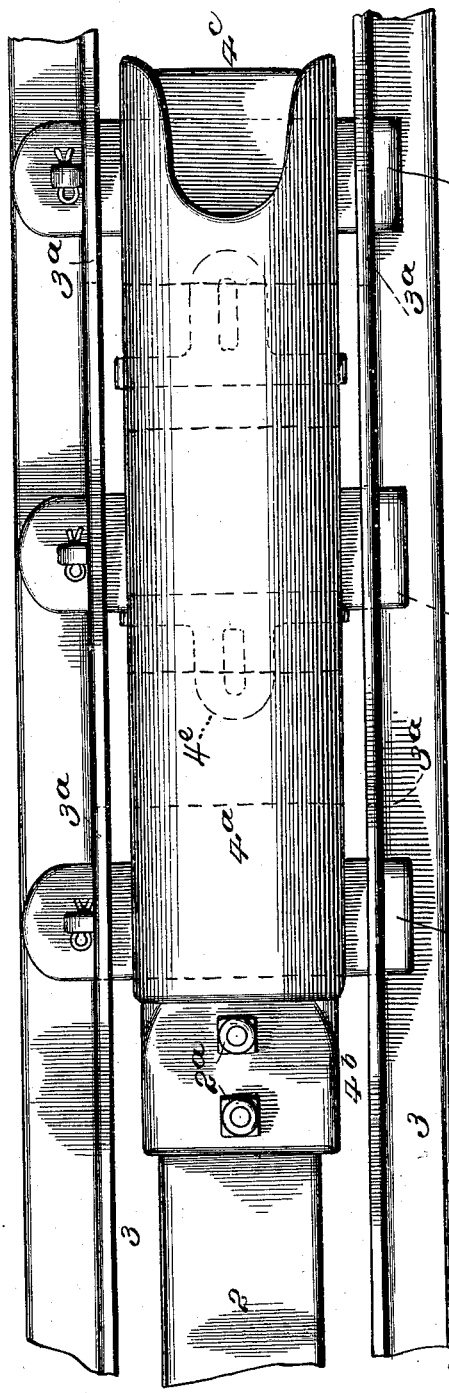

No. 671,369. Patented Apr. 2, 1901.
P. BROWN.
DRAFT MECHANISM.
(Application filed Jan. 26, 1900.)
(No Model.) 3 Sheets—Sheet 3.
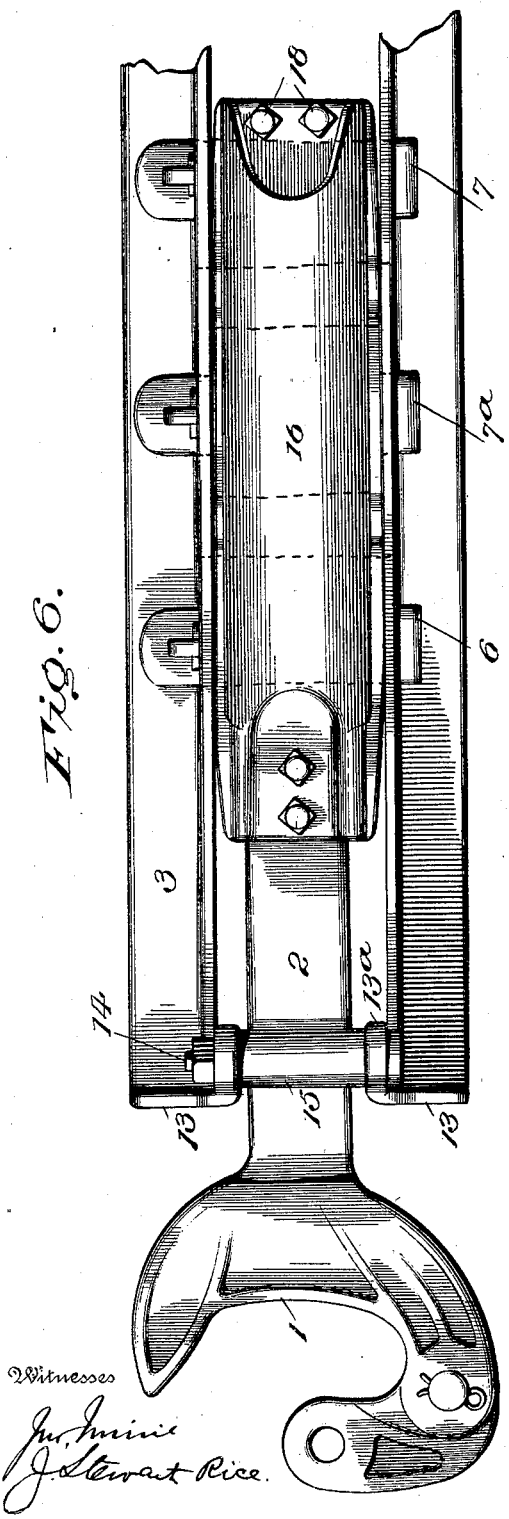
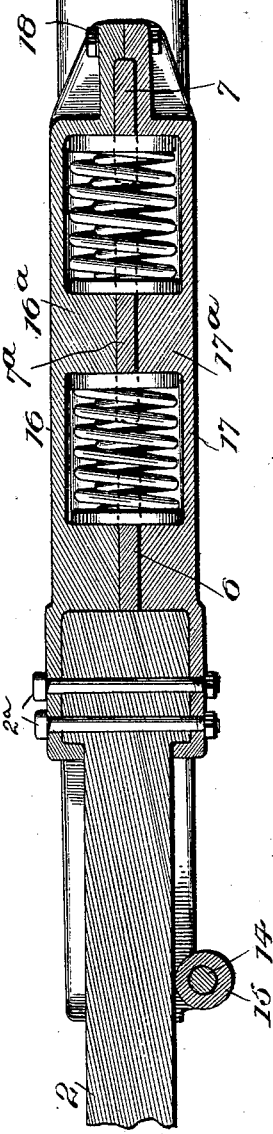
Witnesses  
Inventor  
Perry Brown,  
By Thos. E. Robertson.  
Attorney

UNITED STATES PATENT OFFICE.

PERRY BROWN, OF WILMINGTON, DELAWARE.

DRAFT MECHANISM.

SPECIFICATION forming part of Letters Patent No. 671,369, dated April 2, 1901.

Application filed January 26, 1900. Serial No. 2,924. (No model.)

*To all whom it may concern:*

Be it known that I, PERRY BROWN, a citizen of the United States, residing at Wilmington, in the county of Newcastle and State of Delaware, have invented a certain new and useful Improvement in Draft Mechanism, of which the following is a specification, reference being had to the accompaning drawings.

This invention relates to improvements on that style of draft mechanism shown in my Patents Nos. 598,765 and 632,912 and my pending application, Serial No. 739,420, and has for its object to dispense with the usual yoke or straps connecting the followers and the springs with the draw-bar.

With this object in view and to improve the device in general my invention consists in the peculiar construction, arrangement, and combinations of parts hereinafter more particularly described and then definitely claimed.

In the accompanying drawings, which represent the preferred ways of carrying out my improvements, Figure 1 represents an inverted plan view of the simplest form of my invention. Fig. 2 represents a horizontal longitudinal central section of the same, but in which the draw-bar is shown detached from its connecting means. Fig. 3 is a bottom plan of a draft mechanism arranged in tandem. Fig. 4 is a horizontal longitudinal section of the same. Fig. 5 is a section through the line $x\ x$ of Fig. 4. Fig. 6 shows a modified form arranged on the same general principles, and Fig. 7 shows a vertical central section of the same.

Referring now to the details of the drawings, 1 represents the draw-bar, the shank 2 of which is situated between the draft-irons 3 3, and which shank is usually connected with the spring-actuated followers by a yoke or straps, the front end of the latter being bolted to said shank.

In each of the forms shown in my drawings I dispense with the yoke or straps just mentioned as having been generally used heretofore, and either cast on the shank of the draw-bar, or connect therewith by a key or bolt, the means for holding the springs and connected parts.

Referring now more particularly to Figs. 1 and 2, 4 represents a casting, which in Fig. 1 is formed integral with the shank 2 of the draw-bar 1, but which in Fig. 2 is formed separate therefrom and connected thereto by bolts $2^a$. The casting 4 is made hollow and has, preferably, two horizontal slots 5 5 therein, as clearly shown in Fig. 2. The draft-irons 3 3 are also slotted, as shown at $3^a$ $3^a$, and these slots 5 5 and $3^a$ $3^a$ coincide when the parts are in their normal positions, as shown in Figs. 1 and 2. Passing through the slots $3^a$ $3^a$ in these draft-beams, from one side to the other thereof, and also through the slots 5 5 in the casting 4 are headed flat bars or plates 6 7, which are secured in position by keys 8 and cotters 9. Before the rear flat bar 7 is placed in position, a front follower 10, springs 11, and a rear follower 12 are placed within the hollow casting 4 in the order named, and the rear flat bar 7 is then slipped through its slots, the springs being compressed to allow of this, and is secured by the key and cotter before mentioned. On the front ends of the draft-beams are riveted cast caps 13, each of which is provided with a perforated lug $13^a$, through which passes a spindle 14, on which is placed an antifriction-roller 15 for the purpose of sustaining the weight of the draw-bar with a minimum of friction.

It is obvious that the casting 4 of Figs. 1 and 2 may be made longer and provided with an extra set of springs, followers, and flat bar, in which case a tandem form of rigging is provided having precisely the same operation of parts. This form is shown in Figs. 3, 4, 5, 6, and 7, although in these figures I use a two-part casting $4^a$, instead of the single casting 4 of Figs. 1 and 2.

Referring now more particularly to the form shown in Figs. 3, 4, and 5, $4^a$ represents the hollow casting proper, which is formed at its front end with a socket $4^b$ to receive the shank 2 of the draw-bar, the usual bolts $2^a$ securing them together. In this form the rear end is also cast closed, as shown at $4^c$. To allow the parts to be placed in position, however, it becomes necessary to have an opening $4^d$ near the center, and a cast cover $4^e$ is provided to close this opening. Two integral ears or lugs $4^f$ project from the main casting $4^a$, and these ears or lugs pass through perforations in the cast cover $4^e$, and the latter is secured by two keys $4^g$. The casting $4^a$ is provided with slots $5^a$, corresponding to the slots 5 in Fig. 2, and these slots coincide with slots $3^a$ (shown in dotted lines) in the draft-irons 3. Near the center of the main casting $4^a$ are formed grooves $4^h$, and after the followers and springs have been placed within the hollow casting filling-pieces $4^i$ are inserted in the grooves, as shown clearly in Fig. 4. Corresponding filling-pieces are cast on the cover $4^e$, and when the cover is placed in position these pieces are opposite each other, but do not touch, thus leaving a space or slot between them for the passage of the central or intermediate flat bars. When the followers $10^a$ $10^b$ $10^c$ $12^a$, springs, and filling-pieces have been placed in position and the cover secured on the main casting, the flat bars 6, 7, and $7^a$, are passed through from one draft-beam to the other, the two marked 6 and 7 being located in substantially the same position as in Figs. 1 and 2, and the bar marked $7^a$ passing through the center and through the horizontal slot left between the filling-pieces $4^i$ and the corresponding filling-pieces cast on the cover $4^e$. The central bar, however, has no movement in the slots in the draft-beams, as the bars 6 and 7 have.

In the form shown in Figs. 6 and 7 the two-part casting is divided horizontally, so as to form two parts 16 and 17, bolted to the shank 2, as in Figs. 2 and 3, and the rear ends bolted, as shown at 18. In this form, however, the parts corresponding to the filling-pieces in Figs. 3, 4, and 5 are cast onto the two sections, as shown at $16^a$ and $17^a$, and the springs and followers, exactly like those of Figs. 3 and 4, are placed in exactly the same positions, and the flat bars 6, 7, and $7^a$ coact with these parts, as in the other figures.

From the foregoing and the accompanying drawings it will be seen that I have produced draft-riggings of various forms, in all of which we find the common feature of two or more flat bars passing through slots in the draft-beams and the castings, and coacting with springs arranged between said bars. When the three bars are used with two sets of springs, as in Figs. 3, 4, 6, and 7, the central bar has no movement with respect to the draft-irons, as it snugly fits the slots therein, and when a "pull" is exerted on the draw-bar the casting connecting the followers, bars, and springs with the draw-bar causes the rear flat bar to compress the rear springs between it and the immovable central or intermediate bar, and the casting acting through the follower on the rear of the front spring simultaneously compresses it against the front bar and its followers, which are not movable forwardly, and on an "impact" the front bar, which is movable toward the rear, compresses the front spring against the immovable central bar, and the casting, acting through the follower on the front end of the rear spring, compresses it against the rear follower and its bar, which are held from rearward movement in the rear end of the rear slot.

Of course various alterations may be made without departing from my invention. For instance, the followers could all be dispensed with, in which case the flat bars would act directly on the springs. I prefer to use the followers, however, for when they are not used the wear caused by the flat bars or plates is directly on the springs. Likewise, instead of making the two parts 16 and 17 of cast metal they can be made of channel-iron or half-cylinder-shaped iron; but when made in this way the filling-pieces $16^a$ and $17^a$ would have to be riveted or otherwise secured to the channel-iron instead of being integrally cast thereon.

While I have shown my invention in connection with castings, I do not limit my invention thereto, and although it is the object of this invention to dispense with the usual yoke or straps I wish it understood that some of my claims which do not mention castings are broad enough to cover draft-riggings constructed with the peculiar arrangement of springs and flat bars shown in the drawings.

What I claim as new is—

1. In a draft mechanism; the combination of draft-beams; a coupler having its standard "M. C. B." or the ordinary draw-bar shank situated between said beams; a casing projecting from said shank and having independent slots therein; bars or plates passing through said independent slots and supported by said draft-beams; and a spring within said casing between said bars or plates and coacting therewith; substantially as described.

2. In a draft mechanism; the combination of draft-beams; a coupler having its standard "M. C. B." or the ordinary draw-bar shank situated between said beams; a slotted casing projecting rearwardly from said shank and having an open rear end; bars or plates passing through slots in said shank and supported by said draft-beams; and a spring within said casing, between said bars or plates and coacting therewith; the said spring arranged to be inserted through the open rear end of said shank; substantially as described.

3. In a draft mechanism; the combination of slotted draft-beams; a draw-bar between the same; a casing having three slots therein; three bars or plates passing through the slots in said casing and draft-beams; and springs arranged within the casing; one set of springs being between the first and second bars or plates, and another between the second and third bars or plates; substantially as described.

4. In a draft mechanism; the combination of slotted draft-beams; a draw-bar between the same; a casing having three slots therein; three bars or plates passing through the slots in said casing and draft-beams; followers within the casing and against said bars or plates; and springs arranged within the casing; one set of springs between the first and second bars and their followers; and another set between the second and third bars and their followers; substantially as described.

5. In a draft mechanism; the combination of draft-beams having slots or openings therein; a draw-bar between the same; a two-part casing having independent slots therein; a plurality of bars or plates passing through the independent slots in said two-part casing and through said draft-beams; and a spring within said two-part casing between said bars or plates and coacting therewith; substantially as described.

6. In a draft mechanism; the combination of draft-beams having slots or openings therein; a draw-bar between the same; a two-part casing having independent slots therein and connected with said draw-bar; a plurality of bars or plates passing through the independent slots in said two-part casing and through said draft-beams; followers against said bars or plates; and a spring within the casing between said followers and coacting therewith; substantially as described.

7. In a draft mechanism; the combination of slotted draft-beams; a draw-bar between the same; a two-part casing having slots therein and connected with said draw-bar; three bars or plates passing through the slots in said two-part casing and draft-beams; and springs within the casing between said bars or plates and coacting therewith; substantially as described.

8. In a draft mechanism; the combination of slotted draft-beams; a draw-bar between the same; a two-part casing having slots therein and connected with said draw-bar; three bars or plates passing through the slots in said two-part casing and draft-beams; followers between said bars or plates; and springs within the casing between said followers and coacting therewith; substantially as described.

9. In a draft mechanism; the combination of slotted draft-beams; a draw-bar between the same; a two-part casing having slots therein and connected with said draw-bar; three bars or plates passing through the slots in said two-part casing and draft-beams; followers between said bars or plates, but independent thereof; and springs within the casing between said followers and coacting therewith; substantially as described.

10. In a draft mechanism; the combination of slotted draft-beams; a draw-bar between the same; three plates or bars passing through the slots of said draft-beams; springs between said plates or bars; and means for connecting said plates or bars and springs with said draw-bar; substantially as described.

11. In a draft mechanism; the combination of slotted draft-beams; a draw-bar between the same; three plates or bars passing through the slots of said draft-beams; followers between said plates; springs between said followers; and means for connecting said plates or bars, followers and springs with said draw-bar; substantially as described.

In testimony whereof I affix my signature, in the presence of two witnesses, this 16th day of January, 1900.

PERRY BROWN.

Witnesses:
   J. STEWART RICE,
   THOS. E. ROBERTSON.